(12) United States Patent
Nakfour

(10) Patent No.: US 11,222,261 B2
(45) Date of Patent: Jan. 11, 2022

(54) SUPPORTING MACHINE LEARNING MODELS DISTRIBUTED AMONG MULTIPLE MOBILE NODE DEVICES

(71) Applicant: Red Hat, Inc., Raleigh, NC (US)

(72) Inventor: Juana Elias Nakfour, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 904 days.

(21) Appl. No.: 15/605,418

(22) Filed: May 25, 2017

(65) Prior Publication Data

US 2018/0341853 A1    Nov. 29, 2018

(51) Int. Cl.
| | |
|---|---|
| *G06N 3/04* | (2006.01) |
| *G06N 3/08* | (2006.01) |
| *H04L 29/08* | (2006.01) |
| *H04W 4/02* | (2018.01) |
| *G06N 3/063* | (2006.01) |
| *H04W 4/38* | (2018.01) |

(52) U.S. Cl.
CPC ............. *G06N 3/08* (2013.01); *G06N 3/0454* (2013.01); *G06N 3/063* (2013.01); *H04L 67/10* (2013.01); *H04L 67/12* (2013.01); *H04L 67/18* (2013.01); *H04W 4/02* (2013.01); *H04W 4/026* (2013.01); *H04W 4/027* (2013.01); *H04W 4/38* (2018.02)

(58) Field of Classification Search
CPC ................................................ G06K 9/00805
USPC ..................................................... 706/15, 45
See application file for complete search history.

(56) References Cited

U.S. PATENT DOCUMENTS

| | | | |
|---|---|---|---|
| 6,615,137 | B2 | 9/2003 | Lutter et al. |
| 6,721,632 | B2 | 4/2004 | Fallenstein |
| 9,058,703 | B2 | 6/2015 | Ricci |
| 9,230,019 | B2 | 1/2016 | Koonce et al. |
| 9,381,916 | B1* | 7/2016 | Zhu ................... G01S 13/931 |
| 10,705,796 | B1* | 7/2020 | Doyle .................... G06F 7/08 |
| 2016/0142868 | A1* | 5/2016 | Kulkarni ................ H01Q 1/24 455/456.5 |

(Continued)

OTHER PUBLICATIONS

Li, "An Agent-based Coordination Strategy for Information Propagation in Connected Vehicle Systems", Blekinge Tekniska Hogskola, Jan. 2014, 50 pages.

(Continued)

*Primary Examiner* — David R Vincent
(74) *Attorney, Agent, or Firm* — Lowenstein Sandler LLP

(57) ABSTRACT

An implementation of the disclosure provides an apparatus comprising a memory to store classification data of a machine learning model; and a processing device, operatively coupled to the memory, to detect characteristics of an object. The characteristics comprise at least a spatial position of the object. Sensor information is received from a node device. The sensor information is indicative of at least one of: a spatial position, a speed or a direction of movement of the node device. Using the sensor information, it is determined whether the node device is within a threshold with respect to the object in accordance with the detected characteristics. Responsive to determining that the node device is within the threshold, a notification related to at least part of the classification data and the one or more characteristics is provided to the node device. The classification data is representative of a classification of the object.

18 Claims, 5 Drawing Sheets

(56) References Cited

U.S. PATENT DOCUMENTS

| | | | |
|---|---|---|---|
| 2016/0357262 A1* | 12/2016 | Ansari | G06F 3/017 |
| 2018/0072313 A1* | 3/2018 | Stenneth | G08G 1/0112 |
| 2018/0124646 A1* | 5/2018 | Thubert | H04W 4/70 |

OTHER PUBLICATIONS

Uhlemann, "Introducing Connected Vehicles, Connected Vehicles,", Feb. 23, 2015, 6 pages.

Giarratana, "How AI is Driving the Future of Autonomous Cars", RW Labs, Dec. 20, 2016, 10 pages.

Pimple et al., "Cognitive Learning Using Distributed Artificial Intelligence", International Journal of Machine Learning and Computing, vol. 5, No. 1, Feb. 2015, 5 pages.

\* cited by examiner

SUPPORTING MACHINE LEARNING MODELS DISTRIBUTED AMONG MULTIPLE MOBILE NODE DEVICES

TECHNICAL FIELD

Implementations of the disclosure relate generally to neural networks and, more specifically, relate to supporting machine learning models distributed among multiple mobile node devices.

BACKGROUND

A neural network generally refers to computation models with the capacity for machine learning and pattern recognition. Machine learning is a type of artificial intelligence that automates data processing using algorithms without necessitating the creation of new programs. In other words, machine learning provides data to a computer, and the computer uses that information to analyze future data and learn from experience.

BRIEF DESCRIPTION OF THE DRAWINGS

The disclosure is illustrated by way of examples, and not by way of limitation, and may be more fully understood with references to the following detailed description when considered in connection with the figures, in which.

DETAILED DESCRIPTION

Figure 1:
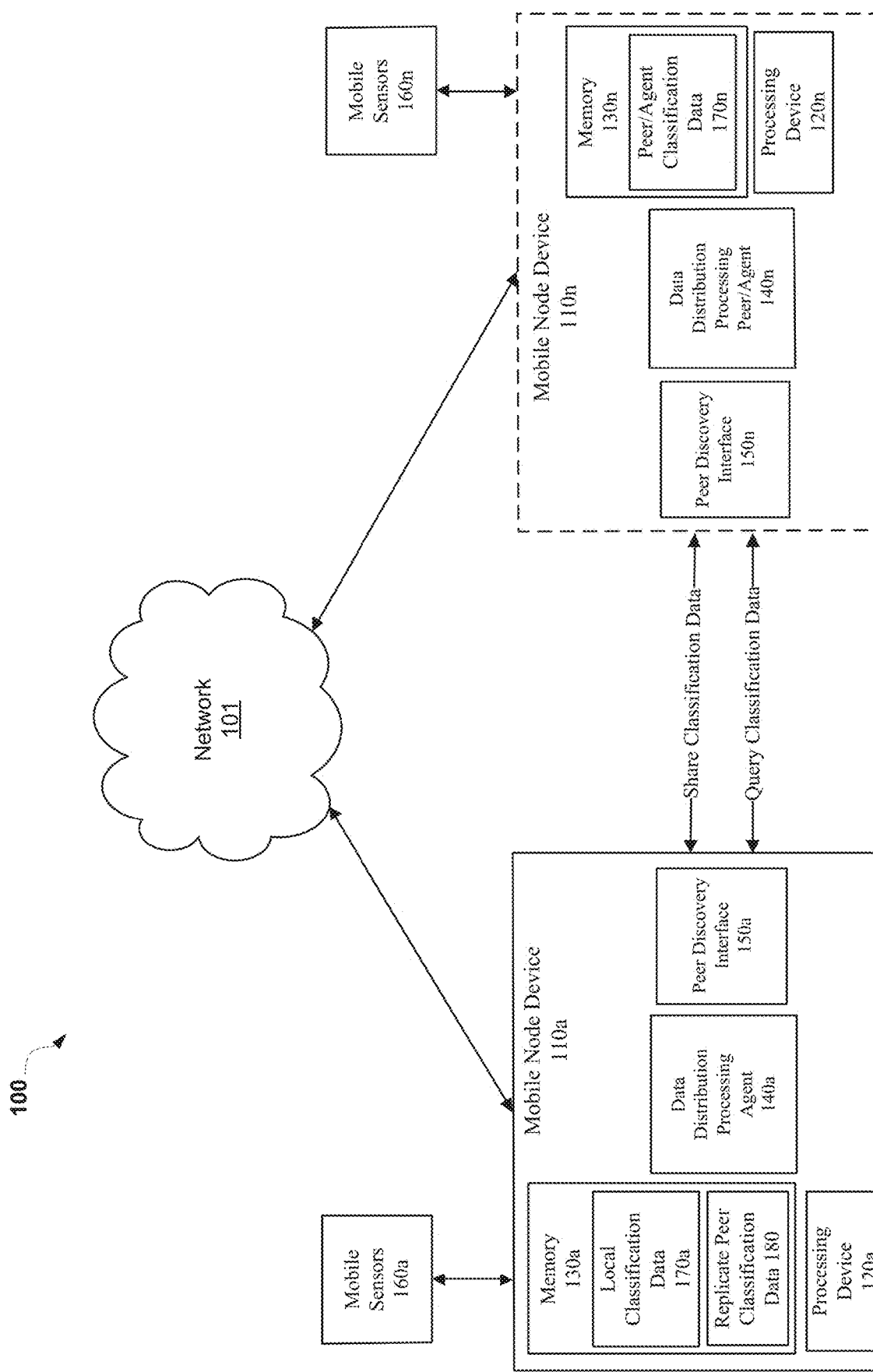
FIG. 1 is a block diagram of a network architecture in which implementations of the disclosure may operate for supporting machine learning models distributed among multiple mobile node devices.

Described herein are techniques for implementing machine learning models distributed among multiple mobile node devices. Although aspect of the disclosure may be particular beneficial for use with certain types of mobile node devices (e.g., self-driving/autonomous vehicles), the methods and systems described herein may be provisioned for use with various types of mobile node devices (e.g., computing devices) that may include, but not limited to, a mobile phone, a cellular device, a tablet computer, wearable computing devices, notebooks or other types of computing devices that are capable of being moved. With respect to some autonomous vehicles (cars, drones, etc.), they can be configured to operate in a self-driving mode in which the vehicle navigates through an environment with little or no input from an operator. Such vehicles may include one or more sensors, such as gyroscopes, accelerometers, positioning and image sensors, which are configured to sense information about the environment. The vehicle may use the sensed information to navigate through the environment. For example, if an output of the sensors is indicative of information that the vehicle is approaching an obstacle, the vehicle may navigate around the obstacle.

To operate in a self-driving mode, some vehicles may implement a neural network. The term "neural network" as used herein refers to a computer-implemented machine learning model designed to simulate the behavior of biological neural networks, e.g., for object and pattern detection, natural language processing and predictive analysis. In some systems, the neural network may be implemented as computer-readable program instructions, e.g., as program code and data organized as a functional data structure, stored in a computer readable storage medium or hardware component or some combination thereof.

The neural network allows the vehicle to use its sensor information about the environment to identify certain objects or obstacles on the road. For example, the neural network can be trained (using certain learning algorithms) to create a network of associations for the different sensor information to identify various objects and environment conditions that can affect the operation of the vehicle. Neural network processing of this type of data may be conducted in cloud server farms that house powerful machines. In some situations, it may be beneficial to conduct a portion of this processing close to the vehicle. In some cases, for example, the neural network processing results are needed in a near-real time, such as when a vehicle is detecting humans crossing a road. In such a situation, by having the processing performed close to the vehicle as opposed to the going back to the cloud, the vehicle may be able to self-operate more safely and efficiently.

Issues may arise, however, if the neural network of the vehicle has not been trained to identify a particular detected object. For example, the neural network may lack sufficient sensor information from the vehicle to identify the object. In some situations, this may be the first time that the neural network on the vehicle has detected a particular object. In other situations, certain conditions, such as light/weather/terrain conditions, position of the object, etc., may make object detection extremely difficult or unavailable. Such situations may lead to increased processing time to identify certain detected objects, which can adversely affect the operation and safety of the autonomous vehicle.

Implementations of the disclosure address the above-mentioned and other deficiencies by supporting distributed machine learning between mobile node devices, such as autonomous vehicles, co-located within a communication range of the surrounding environment. The techniques disclosed herein allow the mobile node devices to share the distribution of data between each other based on a detected object, a location of that object, the type of object, etc. For example, the speed, movement direction and location of peers in addition to the current detected object information may be used to for the distribution and sharing of relevant data for a machine learning model with interested vehicles operating locally, rather than going back to the cloud to utilize data for the model.

In some implementations, an apparatus of an autonomous vehicle may implement a distributed machine-learning network. The distributed machine learning network may be an ad-hoc network established by multiple mobile node devices that directly communicate with each other. In that regard, the machine-learning distributed network comprises of a plurality of mobile node devices (e.g., other self-driving vehicles) that are located within a certain range of each other. Each mobile node device is processing and publishing, to other peer mobile node devices, certain sensor information that is indicative of the speed, spatial position and direction of movement of the given node.

In some implementations, the apparatus (which may be installed in a particular mobile node device) may detect objects and/or alert other mobile node devices of various types of hazards in the surrounding environment. For example, the apparatus may detect certain characteristics of an object in a certain range of the autonomous vehicle, such as an object in the road, a traffic signal device, etc. These detected characteristics may include, for example, a spatial position of the object, mobility of the object, a direction of movement of the object, a type of the object, etc. The apparatus may then locate other node devices in the area that may have information regarding a classification of the detect object or that may be interested in information regarding the object. For example, the apparatus may determine, based on the position, speed and direction of the other mobile node devices, if any have previously detected the object or are moving towards that object. Based on the determination, the apparatus provides a notification to the other devices. This notification may include, for example, a request notification for information for a classification of the object which it may use to identify the object or an alert notification regarding the identity of the object. Thereupon, the apparatus updates a machine learning model with the classification data of the object so that it can accelerate any future recognition of similar objects to increase performance and safety operation of the vehicle.

FIG. 1 is a block diagram of a network architecture 100 in which implementations of the disclosure may operate for supporting machine learning models distributed among multiple mobile node devices, such autonomous vehicles. The network architecture 100 may include a plurality of mobile node devices 110a-n, and a network 101. The mobile node devices 110a-n may be any of a variety of different computing devices such as, for example, a self-driving/autonomous vehicle, drones, etc. In other implementations, the mobile node devices 110a-n may include smart phones, mobile phones, tablet device, personal digital assistants (PDAs), personal navigation devices, portable computers, personal computers (PCs), server computers, palm-sized computing devices, etc.

In one implementation, the mobile node devices 110a-n can move from one location to another. Each of the mobile node devices 110a-n may communicate to another node device via the network 101. Network 101 may be a private network (e.g., Ethernet or a local area Network (LAN)), wide area network (WAN) or a public network (e.g., Internet). In one implementation, the network 101 is a Wi-Fi network. In another implementation, the network is a Bluetooth network. The network architecture 100 may include any number of mobile node devices 110a-n that communicates with each other over the network 101.

As shown in FIG. 1, each of the mobile node devices 110a-n may be coupled to a network 101 and include a processing device or processors 120a-n communicatively coupled to a memory 130a-n. "Processor" herein refers to a device capable of executing instructions encoding arithmetic, logical, or I/O operations. In one illustrative example, a processor may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). The processors 120a-n may also be referred to as a central processing unit (CPU). "Memory" herein refers to a volatile or non-volatile memory device, such as RAM, ROM, EEPROM, or any other device capable of storing data. Although, for simplicity, a single processor 120a-n is depicted in FIG. 1, in some other implementations computer system 100 may comprise a plurality of processors.

The mobile node devices 110a-n may host a data distribution processing agent 140a-n, such as an application that functions to distribute data between the mobile node devices 110a-n. Each of the mobile node devices 110a-n may include mobile sensors 160a-n that captures sensor data to be passed to the data distribution processing agent 140a-n deployed on the mobile node devices 110a-n. These mobile sensors 160a-n may include, for example, accelerometers, digital cameras, global positioning devices and other types of sensors for gathering data regarding the surrounding environment.

In some implementations, the data distribution processing agent 140a-n may implement a type of distributed machine learning by building intelligence (e.g., a set of local classification data 170a-n) regarding a classification of objects in the surrounding area and sharing this classification data 170a-n with other data distribution processing agent 140a-n of peer mobile node devices 110a-n. For example, the classification data 170a-n may include data regarding certain patterns, shapes and other type of characteristics with respect to a particular object, such as the shape of a traffic sign. Based on the mobile sensors 160a-n, an agent (e.g., mobile node device 110a) may experience a new learning event, such as detecting an object in the road, for which it employs a distributed algorithm to identify a classification for that event, such as classifying the object as a person walking in the road just ahead. When a particular data distribution processing agent 140a, identifies some new classification data 170a that may classify a particular object, it may share or otherwise broadcast this classification data to other peers, such as the e.g., data distribution processing agent 140a of peer mobile node device 110n. If the agent is having difficulties in classifying the object because it does not have enough data based on its on sensors, the agent may consult or otherwise query classification data from its peers about the event.

In operation of the distributed machine learning, the process of sharing classification data 170a-n among peers (e.g., mobile node devices 110a-n) and/or querying for the data first involves the discovery of peers and the determination of which of the peer mobile node devices 110a-n to share data. In one implementation, each of the mobile node devices 110a-n may include peer discovery interfaces 150a-n for detecting and/or forming a peer-to-peer network of the network architecture 100 for sharing classification data 170a-n with other mobile node devices. The peer discovery interfaces 150a-n may send and receive requests to and from other mobile node devices that indicate the devices are attempting to share data, such as classification data 170a-n, with each other.

Initially, the peer discovery interface 150a of mobile node device 110a sends a request to link with another of the mobile node devices 110n based on their location being within a certain range. In one implementation, the range may be based on the hardware limitations of the transmission technology used by the peer discovery interface 150a. For example, the range maybe in several meters if Bluetooth technology used by the peer discovery interface 150a. In another example, for Wi-Fi technology, the range may be in tens of meters. In another implementation, the range may be based on transmitting power of the mobile node devices 110a-n.

In one implementation, the distributed machine learning network is established by a first data distribution processing agent, such as data distribution processing agent 150a of node 110a, setting up a network with the agent of a second mobile node device, such as mobile node devices 110n to establish communication with each other. This is followed by third and every other new member of the mobile node devices 110a-n being added by either the first or second node communicating with one of the other node device, and thus establishes the sharing of classification data 170a-n by the peers. For example, the mobile node devices 110a-n may establish a communication link with each other using various communication protocols, such as WiFi, Bluetooth, etc.

The peer discovery interface 150a of the mobile node device 110a may add another mobile node devices to the distributed machine-learning network based on the speed, a spatial position and moving direction of the identified devices. For example, the peer discovery interface 150a may receive sensor information from the mobile sensor 160n that is indicative of speed, position and direction of device 110n. The peer discovery interface 150a uses the speed and direction of mobile node device 110n to determine that the device 110n can be added to the distributed machine learning network, which makes the network processing of the shared classification data 170a-n more efficient, fast and reliable. For instance, it makes the network processing more efficient by sharing classification data 170a-n with peers that are more likely to need or provide the information regarding object in the area because they are in the immediate area. This process of sharing classification data 170a-n of detected objects between the node devices 110a-n is further discussed with respect to FIG. 2.

Figure 2:
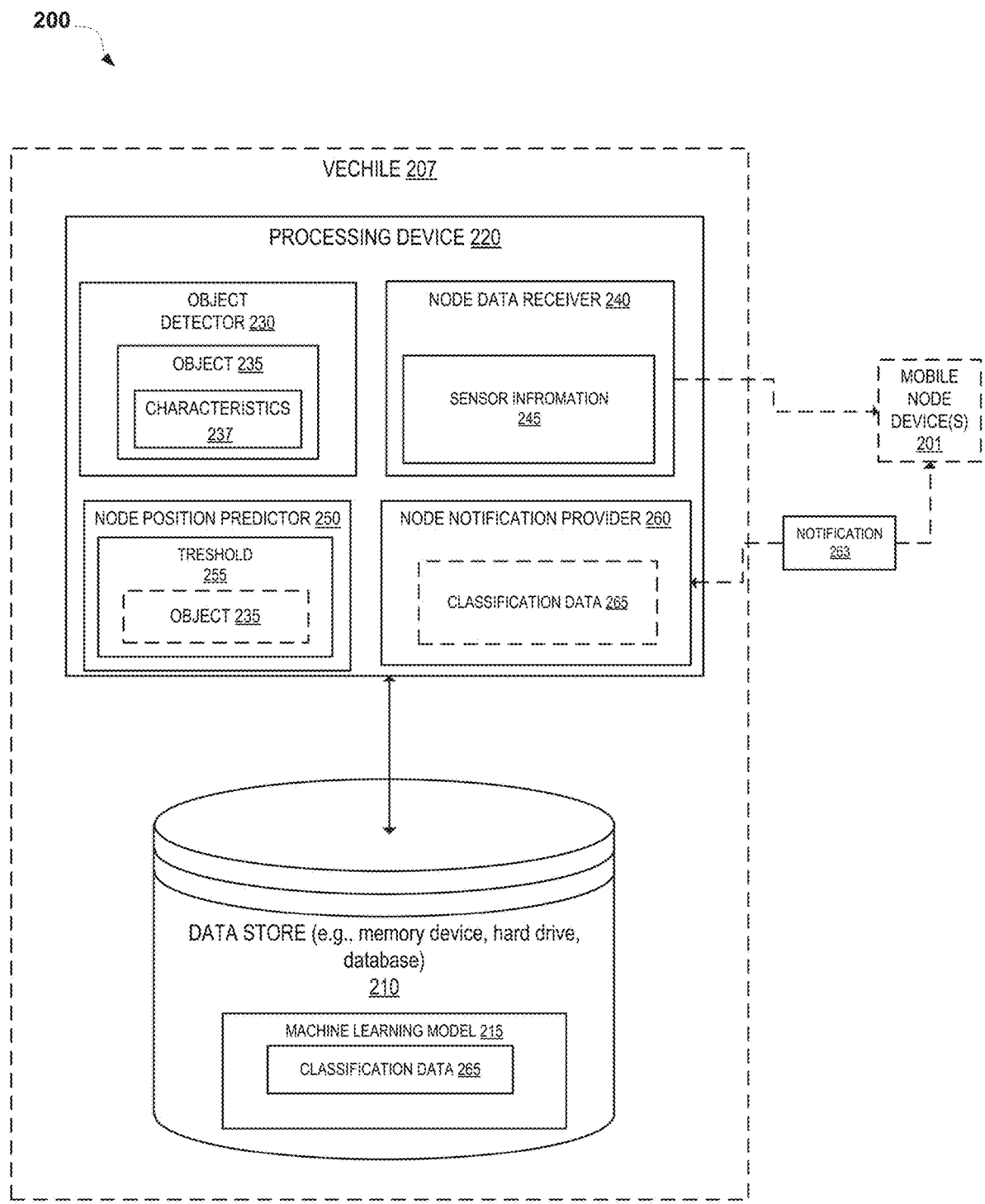
FIG. 2 is a block diagram of an apparatus including a memory for supporting machine learning models distributed among multiple mobile node devices according to an implementation of the disclosure.

FIG. 2 is a block diagram of an apparatus 200 including a memory 210 for supporting machine learning models distributed among multiple mobile node devices (e.g., autonomous vehicles) according to an implementation of the disclosure. The apparatus 200 may be the same or similar to a components within the network architecture 100 of FIG. 1. In some implementations, the apparatus 200 may be installed in device, such as an autonomous vehicle 201. Apparatus 200 may include components for supporting distributed machine learning. In some implementations, the apparatus 200 may include a data store 210 (which may be the memory device 130a-n of FIG. 1) and a processing device 220 (which may be the processor 120a-n of FIG. 1) coupled to the data store 210. In some implementations, the processing device 220 may execute instructions for carrying out the operations of the apparatus 200 as discussed herein. As shown, the apparatus 200 may execute instructions for an object detector 230, a node data receiver 240, a node position predicator 250, and a node notification provider 260 to share classification data that is indicative of the surrounding environment between node devices of the distributed machine-learning network Data store 210 may include any non-persistent data storage (e.g., memory), persistent and/or volatile data storage (e.g., flash storage, hard drive, tape), other medium, or combination thereof that is capable of storing instructions for carrying out the operations of the apparatus 200 discussed herein. In some implementations, the data store 210 may store a machine learning model 215 that is implemented by the apparatus 200 in conjunction with a plurality of node devices, such as node device 201.

In one implementation, the machine learning model 215 may be a neural network designed to simulate the behavior of biological neural networks, e.g., for object and pattern detection, natural language processing and predictive analysis. In some implementations, the neural network may be implemented as computer readable program instructions, e.g., as program code and data organized as a functional data structure, stored in the data store 210 as a computer readable storage medium or a hardware component or some combination thereof. A neural network receives an input, and transforms it through a series of layers. Each layer includes a set of neurons (processing nodes) that detect recognizable patterns in the input data. The neural network may be trained based on these recognizable patterns to determine if the pattern matches certain kinds of objects. For example, the machine learning model 215 may be trained by using classification data 218 received from the mobile node devices 201 to classify certain objects detected by the nodes. For example, the machine learning model 215 may be trained to identify particular patterns in the classification data 218 that are indicative of the shape, size and characteristics of certain objects. Based on these patterns, the machine learning model 215 may detect that the classification data 218 may identify a particular object associated with these patterns, such as a particular shape and color of a traffic sign may indicate that the sign is a stop sign.

In operation of the apparatus 200, the node object detector 230 detects one or more characteristics 237 of an object 235 in a surrounding environment. For example, the object 235 may be detected ahead of the vehicle 207. In some implementations, the node object detector 230 may use one or more sensors of the vehicle 207 to detect these characteristics 237 that include, but not limited to, a spatial position of the object 235, mobility of the object 235, a direction of movement of the object 235, the type of the object 235, etc. The node object detector 230 may detect certain objects in a certain range of the autonomous vehicle, such as an animal or person in the road, a traffic signal device, etc. In this regard, the vehicle 207 coupled to the apparatus 200 may include a plurality of mobile sensors that capture sensor data to be passed to the node object detector 230. These mobile sensors may include, for example, accelerometers, digital cameras, global positioning device and other types of sensors for gathering data regarding the surrounding environment.

The node data receiver 240 receives sensor information 245 from a node device 201 located in the surrounding environment of the vehicle 207. For example, the node device 201 may be within a connection range of the vehicle 207. This sensor information 245 is indicative of a spatial position, speed and direction of the mobile node device 201. The process of sharing data between the node data receiver 240 and the node device 201 first involves the discovery of peer node devices, such as mobile node device 201, and the determination of which of the peers to share data. For example, mobile node device 201 may decide to share data with a particular peer if it determines that the peer device may have a need for the information. In one implementation, the node data receiver 240 may include a peer discovery interface, such as the peer discovery interfaces 150a-n of FIG. 1, for detecting peer devices. The node data receiver 240 may use the interface send and receive requests to and from other mobile node devices that indicate the devices are attempting to share data, such as classification data 218, with each other.

The node position predicator 250 determines whether the node device 201 is within a threshold 255 with respect to the spatial position of the object 235 in view of the sensor information 245. For example, the threshold 255 may indicate a predicted area in the surrounding area in which the node device 201 may be located based on its position, speed and direction with respect to the object 235. In other implementations, the threshold 255 may indicate a predicted range of a moving direction of the mobile node device 201 with respect to object (such as moving away or towards the object 235). If node position predicator 250 determines that a mobile node device 201 is within the threshold 255 with respect a position of the object 235, this may indicate the mobile node device 201 has encountered or is about to encounter the object 235. For example, by comparing the position of the detected object 235 in the surrounding environment and the position, speed and direction, the node position predicator 250 may determine whether the mobile node device 201 is moving toward or away from the object 235.

The node notification provider 260 provides a notification 263 associated with classification data 265 to the mobile node device 201. This classification data 265 is representative of a classification of the detected object 235, which may indicate the identity of the object 235. If it is determined that the mobile node device 201 encountered the object 235 in view of its sensor information 245, the node notification provider 260 may transmit notification 236 comprising a request to the mobile node device for information regarding the classification of the object 235. For example, the apparatus 200 may not have enough information based on its own sensors to determine an identity of the detected object 235. Upon receiving the requested information, the apparatus 200 may then update the machine learning model 215 with the classification data 265 to identify the object 235 so that it can accelerate any future recognition of similar objects to increase performance and safety of the vehicle 207.

In alternative implementations, if it is determined that the mobile node device 201 is moving toward the object 235, the node notification provider 260 may transmit a notification 236 comprising an alert comprising classification data indicating an identification of the object 235. For example, the apparatus 200 compares captured sensor data to the classification data 265 to identify certain patterns indicative of a particular object, such as the shape of a traffic sign. The node notification provider 260 may determine that it should share its classification data 265 regarding the object 235 with mobile node device 201 since that node is moving toward the object 235 and will most likely need this information when it gets to the object 235.

Figure 3:
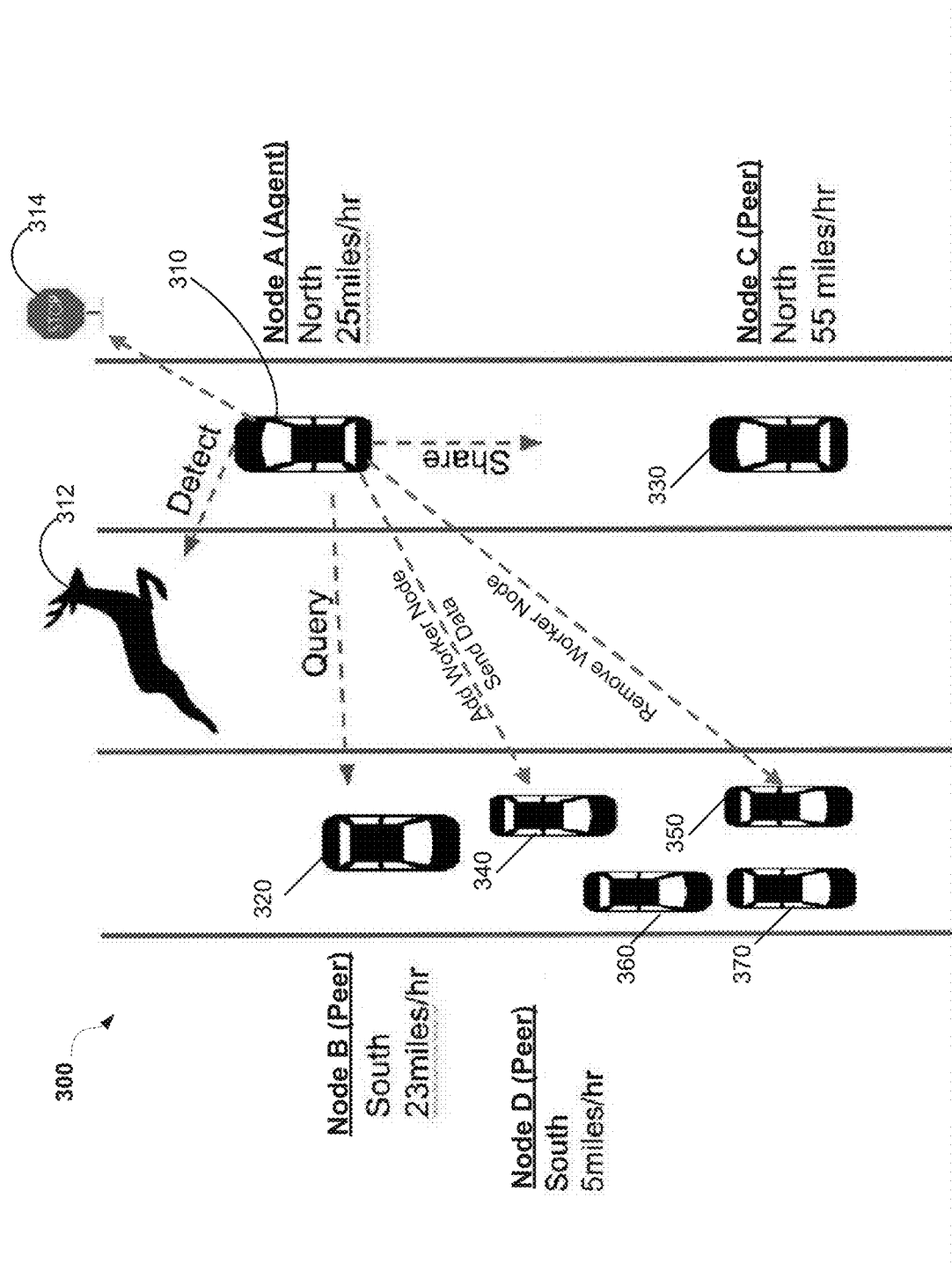
FIG. 3 illustrates a use example of supporting machine learning models distributed among multiple mobile node devices according to an implementation of the disclosure.

FIG. 3 illustrates a use example 300 of supporting machine learning models distributed among multiple mobile node devices (e.g., autonomous vehicles) according to an implementation of the disclosure. This example includes a plurality of mobile nodes, such as Node A 310, Node B 320, Node C 330, Node D 340 as well as nodes 350-370. The plurality of mobile nodes may include a combination of autonomous and non-autonomous vehicles traveling in various directions. The Nodes 310-370 may be anyone of the mobile node device of FIGS. 1 and 2 that are used for creating a distributed machine learning network. In some situations, the distributed machine learning network may be an Ad-hoc network that refers to communication over a network where mobile node devices, such as Nodes 310-370 within a certain range directly communicate with each other without using any wireless central access points. In operation of the distributed machine learning, the Nodes 310-370 may share and/or query for data among peers based on the position, direction and speed of that peer and various objects detected on the road.

In this example, the position, driving direction and speed is used to determine which peer the classification data is shared with by Node A 310. This determination of which peer to share the information with may also be dependent on the type object of interest (e.g., deer 312) and/or its mobility. For example, since the deer 312 in FIG. 3 is moving left to right across the road, then node 340 may have detected it already. If the deer 312 was running right to left, then node 340 may not be used to share information because the node 340 may not have detected the deer 312.

As shown in FIG. 3, mobile node A 310 is moving north, mobile Node C 330 is moving north and mobile Node B 320 is moving south. Node A 310's sensors detect one or more characteristics of an object 314 on the road. The Node A 310 gathers information about the object 314 using one or more sensors and consults its local classification data, such classification data 170a-n of FIG. 1 and classification data 218 of FIG. 2, to identify the object. For example, the Node A 310 compares the captured sensor data to the classification data 218 to identify certain patterns indicative of a particular object, such as the shape of a traffic sign, mobility of the object (e.g., a traffic sign is stationary), type (it is not human or animal), etc. In this example, Node A 310 determines that the object 314 is a "Stop" sign. Node A 310 runs its peer discovery interface and finds Node B 320 moving south in a high speed while Node C 330 is moving north in the same direction at low speed. Node A 310 determines that it should share its classification data regarding the object 314 with Node C 330 since Node C 330 will most likely encounter this object 330 and may need this information when it gets to the object 330.

Node A 310 detects another object 312, but it does not have enough sensor information to identify the object 312. In such as case, Node A 310 executes a distributed machine learning process using the other Nodes 320-370 to identify the object 312. In this example, Node A 310 is designated as the agent with respect to all other mobile nodes that are designated as (worker) peer nodes 320-370. The agent on Node A 310 may select one or more of the worker nodes 320-370 to distribute data to determine the classification of the object 312. Node A 310 is traveling north at a slow speed. It discovers worker nodes, Node B 320, Node C 330 and D 340.

Node A 310 receives sensor information indicative of the position, speed and driving direction of the Nodes and compares to the position of object 312. In this example, Node C is traveling in the same direction but a much faster speed, nodes B 320 and D 340 are traveling in opposite direction but their speeds are slowed because of traffic jam. Node A 310 acts as an agent node and selects Node B 320 and Node D 340 as worker nodes to request data regarding a classification of the object 312 for processing as part of the network. Node A 310 selects Node B 320 and Node D 340 as worker nodes because it determines based on their current position, speed and direction that are within a threshold (such as within a certain range moving away) with respect to the object 312. This may indicate that the node most likely detected the object 312 and, thus has relevant information regarding the identity of the object 312. After receiving the data from either Node B 320 or Node D 340, Node A 310 combines the data to come up with an identity for the object 312 which may be added to the machine learning model of Node A.

In another implementation, Node A 310 is traveling north at a slow speed and detects an object 312 on the left side. Using its local classification data, Node A 310 cannot find information to detect a classification of the object 312. Node A 310 determine whether to query one of the peer Nodes 320-370 for information regarding the object 312. In this regard, Node A 310 executes its peer discovery interface and detects Node B 320 moving south at a low speed while Node C 330 is moving north at a high speed. In this example, since agent B is moving in an opposite direction then Node A 310 and is moving at low speed and object 312 is on the left, Node A 310 selects Node B 310 to query first for classification data regarding the object 312. Node A 320 queries Node B 310 first since there is a higher probability Node B 310 has passed this object already since Nodes A and B are moving in opposite direction.

Figure 4:
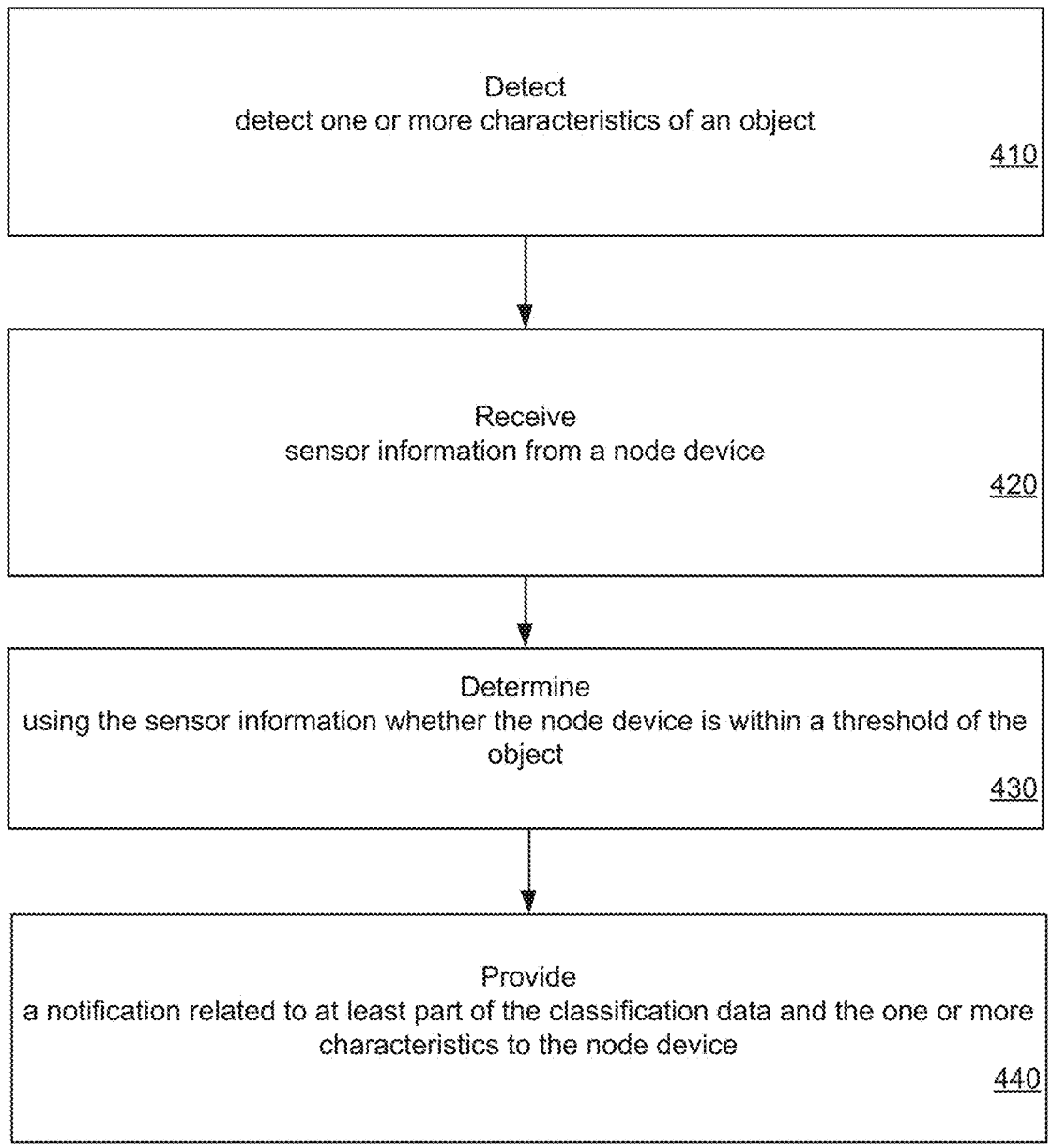
FIG. 4 illustrates a flow diagram illustrating a method of supporting machine learning models distributed among multiple mobile node devices according to an implementation of the disclosure.

FIG. 4 illustrates a flow diagram illustrating a method 400 according to an implementation of the disclosure. In one implementation, the data distribution processing agent 140a-n of FIG. 1 and/or the processing device 220 of FIG. 2 may perform method 400 for supporting machine learning models distributed among multiple mobile node devices (e.g., autonomous vehicles). The method 400 may be performed by processing logic that may comprise hardware (circuitry, dedicated logic, etc.), software (such as is run on a general purpose computer system or a dedicated machine), or a combination of both. Alternatively, in some other implementations, one or more processors of the computer device executing the method may perform routines, subroutines, or operations may perform method 400 and each of its individual functions. In certain implementations, a single processing thread may perform method 400. Alternatively, two or more processing threads with each thread executing one or more individual functions, routines, subroutines, or operations may perform method 400. It should be noted that blocks of method 400 depicted in FIG. 4 can be performed simultaneously or in a different order than that depicted.

Referring to FIG. 4, at block 410, method 400 detects one or more characteristics 237 of an object 235. The one or more characteristics 237 comprise a spatial position of the object 235. In other implementations, the characteristics may also include the mobility of the object, a direction of movement of the object, a type of the object, etc. In block 420, sensor information 245 is received from a mobile node device 201. The sensor information 245 is indicative of at least one of: a spatial position, speed and direction of the mobile node device 201. In block 430, it is determined, using the sensor information 245, whether the mobile node device 201 is within a threshold 255 with respect to at least the spatial position of the object 235 in accordance with the detected characteristics 237. For example, the threshold 255 may indicate a predicted distance of the mobile node device 201 to the object 235, or a predicted moving direction of the mobile node device 201 (such as moving away or towards the object 235) within a certain range of the object 235, or other types of thresholds. Responsive to determining that the mobile node device 201 is within the threshold 255, a notification 263 related to at least part of classification data 265 and the one or more characteristics 237 is provided to the mobile node device 201. The classification data 265 is representative of a classification of the object 235.

Figure 5:
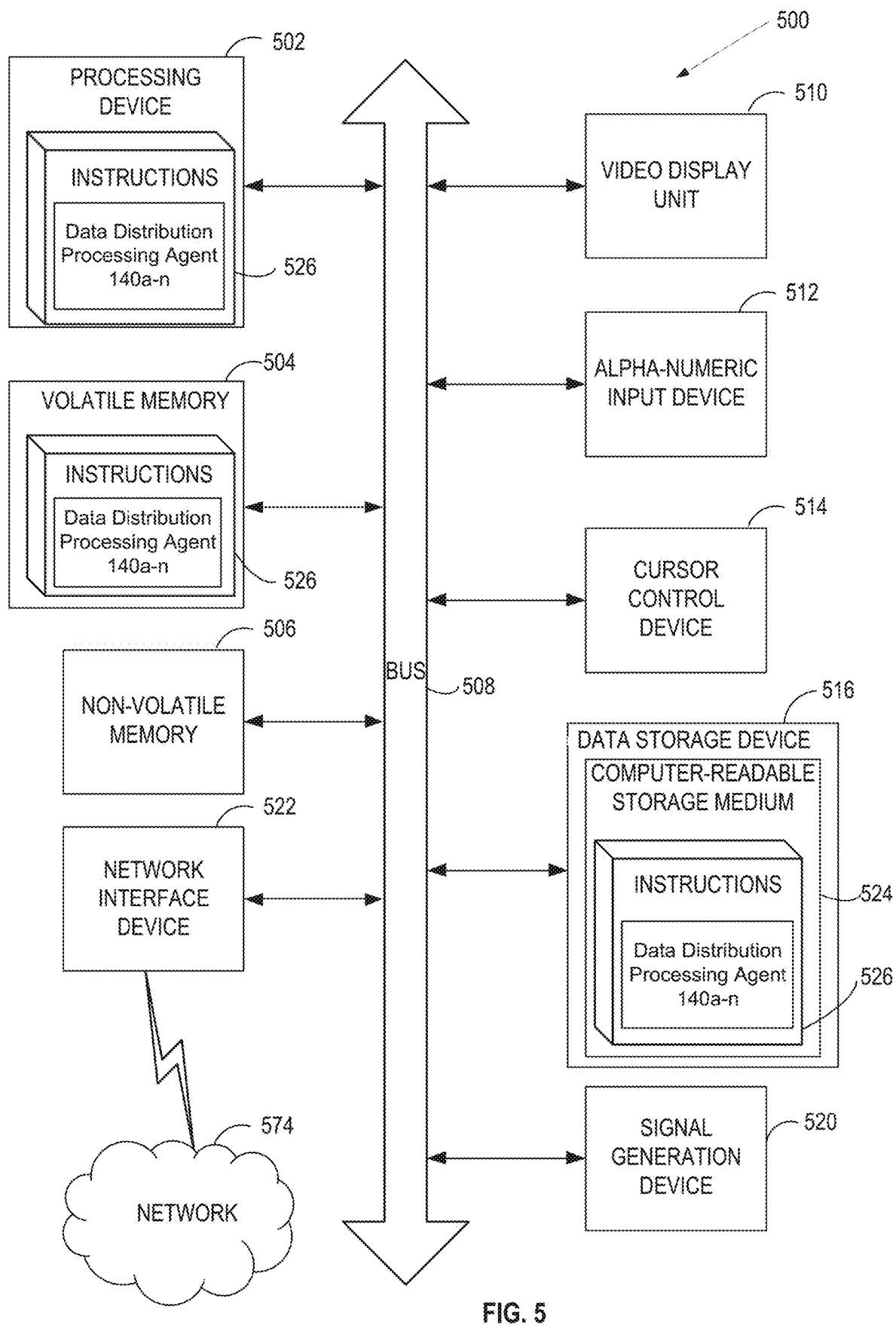
FIG. 5 illustrates a block diagram illustrating a computer system in which implementations of the disclosure may be used.

FIG. 5 depicts a block diagram of a computer system 500 operating in accordance with one or more aspects of the disclosure. In various illustrative examples, computer system 500 may correspond to the apparatus 200 of FIG. 2. In some implementations, the computer system 500 may support machine learning models distributed among multiple mobile node devices.

In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein for live storage domain decommissioning.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 610 (e.g., an LCD), an alpha-numeric input device 512 (e.g., a keyboard), a cursor control device 614 (e.g., a mouse), and a signal generation device 520.

Data storage device 516 may include a computer-readable storage medium 524 (e.g., a non-transitory computer-readable storage medium) on which may store instructions 526 encoding any one or more of the methods or functions described herein, including instructions encoding the data distribution agent 140a-n of FIG. 1 for implementing method 400 of FIG. 4 to support machine learning models distributed among multiple mobile node devices.

Instructions 526 may also reside, completely or partially, within volatile memory 504 and/or within processing device 502 during execution thereof by computer system 600, hence, volatile memory 504 and processing device 502 may also constitute machine-readable storage media.

While non-transitory computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs. Unless specifically stated otherwise, terms such as "receiving," "detecting," "providing," "determining," "adding," "removing," "comparing" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

It is to be understood that the above description is intended to be illustrative, and not restrictive. Many other implementation examples will be apparent to those of skill in the art upon reading and understanding the above description. Although the disclosure describes specific examples, it will be recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. An apparatus comprising:
a memory to store first classification data of a machine learning model; and
a processing device, operatively coupled to the memory, to:
detect one or more characteristics of an object, wherein the one or more characteristics comprise at least a spatial position of the object;
responsive to failing to determine, using the machine learning model processing the one or more detected characteristics in view of the first classification data, a classification of the object, identify a first node device and a second node device each located within a threshold with respect to at least the spatial position of the object, wherein each of the first node device and the second node device comprises a peer apparatus that is physically distant from the apparatus;
obtain first sensor data collected by the first node device and second sensor data collected by the second node device, wherein the first sensor data corresponds to a presence of the object and the second sensor data does not correspond to the presence of the object;
determine, using the first sensor data and the second sensor data, that the first node device detected the presence of the object and the second node device did not detect the presence of the object;
responsive to determining that the first node device detected the presence of the object, request, from the first node device, second classification data that is indicative of the classification of the object; and
responsive to receiving the second classification data from the first node device, determine, using the machine learning model processing the second classification data, the classification of the object.

2. The apparatus of claim 1, wherein the processing device is further to update the machine learning model with the classification of the object in view of the second classification data.

3. The apparatus of claim 1, wherein the processing device is further to:
receive the first sensor data from the first node device and the second sensor data from the second node device, wherein the first sensor data is indicative of at least one of: a spatial position, a speed, or a direction of movement of the first node device and the second sensor data is indicative of at least one of the spatial position, the speed, or the direction of movement of the second node device.

4. The apparatus of claim 3, wherein to determine whether the first node device or the second node device detected the presence of the object, the processing device is to determine, using the first sensor data and the second sensor data, whether the first node device or the second node device is within a determined range moving away from the object.

5. The apparatus of claim 1, wherein the processing device is further to determine whether the second node device is within a determined range moving toward the object.

6. The apparatus of claim 5, wherein the processing device is further to, responsive to determining that the second node device is moving toward the object, provide an alert notification comprising the second classification data to the second node device.

7. The apparatus of claim 1, wherein the one or more characteristics further comprises at least one of: mobility of the object, a direction of movement of the object or a type of the object.

8. A method comprising:
detecting, by a processing device for an apparatus, one or more characteristics of an object, wherein the one or more characteristics comprise at least a spatial position of the object;
responsive to failing to determine, using a machine learning model processing the one or more detected characteristics in view of first classification data of the machine learning model, a classification of the object, identifying a first node device and a second node device each located within a threshold with respect to at least the spatial position of the object, wherein each of the first node device and the second node device comprises a peer apparatus that is physically distant from the apparatus;

obtaining first sensor data collected by the first node device and second sensor data collected by the second node device, wherein the first sensor data corresponds to a presence of the object and the second sensor data does not correspond to the presence of the object;

determining, using the first sensor data and the second sensor data, that the first node device detected the presence of the object and the second node device did not detect the presence of the object;

responsive to determining that the first node device detected the presence of the object, requesting, by the processing device from the first node device, second classification data that is indicative of the classification of the object; and responsive to receiving the second classification data from the first node device, determining, using the machine learning model processing the second classification data, the classification of the object.

9. The method of claim 8, further comprising updating the machine learning model with the classification of the object in view of the second classification data.

10. The method of claim 8, further comprising:
receiving the first sensor data from the first node device and the second sensor data from the second node device, wherein the first sensor data is indicative of at least one of: a spatial position, a speed, or a direction of movement of the first node device and the second sensor data is indicative of at least one of the spatial position, the speed, or the direction of movement of the second node device.

11. The method of claim 10, wherein determining whether the first node device or the second node device detected the presence of the object comprises:
determining, using the first sensor data and the second sensor data, whether the first node device or the second node device is within a determined range moving away from the object.

12. The method of claim 8, further comprising determining whether the second node device is within a determined range moving toward the object.

13. The method of claim 12, further comprising, responsive to determining that the second node device is moving toward the object, providing an alert notification comprising the second classification data to the second node device.

14. The method of claim 8, wherein the one or more characteristics further comprises at least one of: mobility of the object, a direction of movement of the object or a type of the object.

15. A non-transitory computer-readable storage medium comprising instructions that, when executed by a processing device for an apparatus, cause the processing device to:
detect, by the processing device, one or more characteristics of an object, wherein the one or more characteristics comprise at least a spatial position of the object;
responsive to failing to determine, using a machine learning model processing the one or more detected characteristics in view of first classification data of the machine learning model, a classification of the object, identify a first node device and a second node device located within a threshold with respect to at least the spatial position of the object, wherein each of the first node device and the second node device comprises a peer apparatus that is physically distant from the apparatus;
obtain first sensor data collected by the first node device and second sensor data collected by the second node device, wherein the first sensor data corresponds to a presence of the object and the second sensor data does not correspond to the presence of the object;
determine, using the first sensor data and the second sensor data, that the first node device detected a presence of the object and the second node device did not detect the presence of the object;
responsive to determining that the first node device detected the presence of the object, request, from the first node device, second classification data that is indicative of the classification of the object; and
responsive to receiving the second classification data from the first node device, determine, using the machine learning model processing the second classification data, the classification of the object.

16. The non-transitory computer-readable storage medium of claim 15, wherein the processing device is further to update the machine learning model with the classification of the object in view of the second classification data.

17. The non-transitory computer-readable storage medium of claim 15, wherein the processing device is further to:
receive the first sensor data from the first node device and the second sensor data from the second node device, wherein the first sensor data is indicative of at least one of: a spatial position, a speed, or a direction of movement of the first node device and the second sensor data is indicative of at least one of the spatial position, the speed, or the direction of movement of the second node device.

18. The non-transitory computer-readable storage medium of claim 15, wherein the one or more characteristics further comprises at least one of: mobility of the object, a direction of movement of the object or a type of the object.

* * * * *